United States Patent [19]

Zardi et al.

[11] 4,199,537
[45] Apr. 22, 1980

[54] LIQUID DISTRIBUTOR FOR THIN-FILM, TUBE-BUNDLE APPARATUS

[75] Inventors: Umberto Zardi, San Donato Milanese; Vincenzo Lagana', Milan, both of Italy

[73] Assignee: Snamprogetti S.p.A., Milan, Italy

[21] Appl. No.: 951,158

[22] Filed: Oct. 13, 1978

Related U.S. Application Data

[62] Division of Ser. No. 724,601, Sep. 20, 1976, Pat. No. 4,134,939.

[30] Foreign Application Priority Data

Sep. 26, 1975 [IT] Italy ............... 27681 A/75

[51] Int. Cl.² .................................. B01F 3/04
[52] U.S. Cl. ......................... 261/112; 165/118; 165/174; 239/193; 261/97; 261/110
[58] Field of Search ............. 261/97, 98, 110, 112, 261/114 R, 119 R, 153, DIG. 44; 239/193, 194; 165/118, 174

[56] References Cited

U.S. PATENT DOCUMENTS

| 1,460,490 | 7/1923 | Johnston | 261/98 |
| 1,604,769 | 10/1926 | Fox | 261/112 X |
| 1,798,824 | 3/1931 | White | 165/174 X |
| 1,914,700 | 6/1933 | Mitchum | 165/118 |
| 2,944,966 | 7/1960 | Eickmeyer | 261/112 X |
| 3,016,067 | 1/1962 | Edmonds | 165/118 X |
| 3,385,577 | 5/1968 | Epstein | 261/114 R |
| 3,524,731 | 8/1970 | Effron et al. | 261/97 X |
| 3,864,439 | 2/1975 | Tanigawa et al. | 261/114 R |
| 3,880,961 | 4/1975 | Alcock | 261/97 X |
| 4,134,939 | 1/1979 | Zardi et al. | 261/110 X |

Primary Examiner—Richard L. Chiesa
Attorney, Agent, or Firm—Morgan, Finnegan, Pine, Foley & Lee

[57] ABSTRACT

A distributor of liquid is disclosed, to be used in chemical apparatus having a bundle of tubes in the interior of which the liquid to be treated is distributed in the form of a thin film flowing on the internal surfaces of the tubes, the improvement consisting in the combination of a bell placed on the top surface of the tube plate and having liquid passageways formed along its bottom edge, a foraminous collar-like component placed at the bell top for feeding the liquid, and a plurality of distribution sleeves having the form of tubes through the sidewalls of which tangential bores are formed, there being one distribution sleeve for each tube of the bundle.

4 Claims, 6 Drawing Figures

LIQUID DISTRIBUTOR FOR THIN-FILM, TUBE-BUNDLE APPARATUS

This application is a division of Ser. No. 724,601; now U.S. Pat. No. 4,134,939 filed Sept. 20, 1976 entitled "Liquid Distributor For Thin-Film, Tube-Bundle Apparatus".

This invention relates to a liquid distributor for thin-film, tube-bundle apparatus.

More particularly, the present invention relates to a distributor for heat-exchangers, absorbers, desorbers, strippers, reactors, decomposition apparatus of the tube-bundle type in which the fluid is to flow within the tubes in the form of a thin film.

In a number of basic operations as provided in industrial installations, it is required that an even distribution of a liquid be provided, in the form of a thin film, on exchange surfaces which are usually of the tube-bundle type.

The distribution of the liquid should be even all over the exchange surface of the apparatus, to prevent the following drawbacks:

1. Low efficiency of the heat exchange in heat-exchangers, decomposers, reactors and desorption apparatus.
2. Low yields in the exchange of materials in absorbers and decomposers using a stripping agent.
3. Separation of solid phases and thus a high soiling.
4. Formation of hot spots with possible breakages in case corrosive fluids are used.

There are known in the art a few methods for distributing a liquid in the form of thin films.

One of these methods provides for feeding the liquid to a tubing which is equipped with an external jacket for either heating or cooling, and with an internal rotor having longitudinal vanes of the same length as the tubes, intended to urge the liquid against the walls centrifugally, thus originating the thin film.

It is apparent that in such a system, in spite of the fact that it provides a thin film in an expedient way, there is the drawback that a motor is required and that the system cannot be used for a high rate of flow of liquid, for in this case a number of these apparatus would be necessary, and the operation would thus become cumbersome and the costs, of necessity, would grow too high.

Other systems provide for feeding the liquid in the interior of the vertical tube-bundle apparatus by a central tubing placed coaxially to the system.

The liquid which has thus been fed is collected on the top tube plate of the system, with a motion from the center towards the periphery.

In its motion, the liquid encounters sleeves, each of which is connected to a tube of the tube plate, said sleeves having their top edge serrated, as shown in FIG. 1, or fitted with tangential grooves as shown in the accompanying FIG. 2.

The liquid thus enters, via said sleeves, into the tubing. But the sleeves having serrated top edges and those having tangential grooves cannot be used under a liquid "head" so that the distribution of the liquid in the tubings is not uniform. The sleeves fitted with tangential grooves, moreover, have also the defect of being difficult to manufacture and thus their cost is comparatively high.

Lastly, the motion of the liquid from the center towards the periphery is such as to favor the tubes nearer to the center relatively to those placed at the periphery, the result being an increase of the unevenness of the liquid distribution.

It has been found that it is possible to overcome all the drawbacks of the conventional art while concurrently considerably reducing the first cost of the distributor, by feeding the liquid to be distributed within the tubes in the peripheral zone of the tube bundle and employing cylindrical sleeves having bores which are tangential relative to the internal cylindrical surface of said sleeves.

An object of the present invention is to provide a liquid distributor for tube-bundle apparatus of the thin-film type, composed of the following component parts:

(1) a bell resting on the top of a horizontal tube plate supporting a vertically arranged tube bundle, said bell being open at its top end to allow the flow of vapors and having its (resting) edge fitted with openings so as to enable the liquid to wet the entire tube plate beneath the bell (in limiting conditions, the bell could even by a cylinder or cone).

(2) A foraminous collar at or adjacent the top of the bell to feed the liquid to the annular area between the outer bell surface and the inner surface of a shell housing the apparatus including the tubes to which the liquid is to be distributed.

(3) Distribution sleeves, one for each tube of the tube plate, said sleeves having the form of cylindrical pipes having an inside diameter smaller than the inside diameter of the tubes and fastened at their lower ends to the tubes of the tube plate and open at the upper end, said sleeves being fitted with bores extending through their wall thickness tangentially to the internal surface of the sleeves, the diameter of the bores being between 0.2 and 12 millimeters, preferably being from 2 to 4 millimeters, all bores being evenly spaced apart from each other and arranged on the same horizontal plane or on two horizontal planes.

The liquid enters, through the foraminous collar into the annular zone located between the bell and the inner wall of the shell housing the apparatus, as outlined above, and creates a "head" at the bell bottom, said "head" being then adapted to cause the liquid to flow into the interior of the bell through the openings formed on the resting edge of the bell. In the interior of the bell, thus another liquid "head" will obtain, which is enough to enable the liquid to flow through the bores of the sleeves, and, therefrom, into the interiors of the tubes.

The distribution is thoroughly uniform due to the constant liquid heads, to the motion of the liquid from the outside towards the center and to the particular configuration of the sleeve bores.

The invention will now be described with the aid of the accompanying drawings, FIGS. 3, 4, 5 and 6 which, of course, are illustrative and should not be construed as limitations to the invention.

Figure 3:
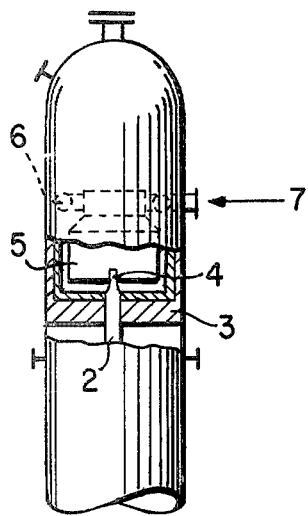
FIG. 3 is an elevation, broken away in part, of a liquid distributor for tube-bundle, thin-film apparatus embodying our invention.

In FIG. 3, the numeral 1 indicates a shell housing the apparatus including the tubes in which it is desired to carry out the thin film distribution, at 2 there is indicated one tube of the tube bundle, 3 is a horizontal tube plate, 4 is a sleeve, 5 the bell, 6 the foraminous collar for feeding the liquid and 7 is the conduit which feeds the liquid to the above indicated collar from the outside.

The collar in the Figures has a toroidal outline and is perforated in its bottom section. Other kinds of feed can obviously be used without departing from the scope of the present invention.

Figure 4:
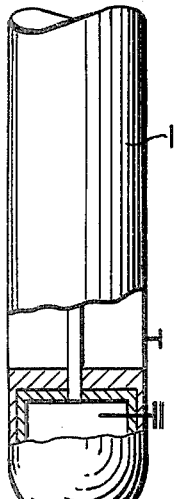
FIG. 4 is a sectional elevation, greatly enlarged, of a portion of the apparatus illustrated in FIG. 3.
Figure 4:
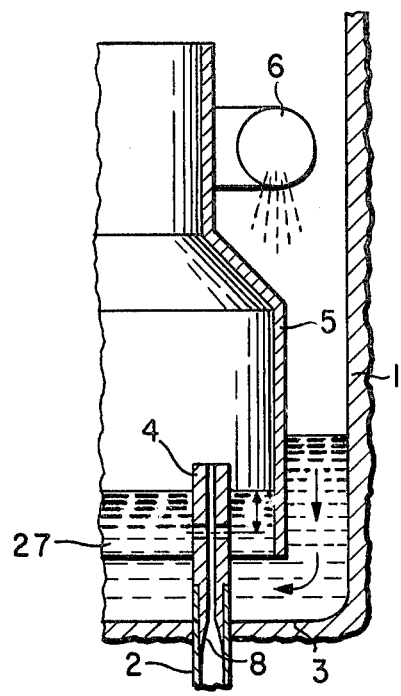

FIG. 4 is an enlarged detail of the distributor embodying our invention. The numerals have the same meanings as in FIG. 3, the numeral 27 indicating the liquid head which bears against upon the sleeve bores. The sleeve 4 has been shown in phantom. It can be observed that the inside diameter of the sleeve is less than the inside diameter of the tube 2, consistently with the invention.

Due to the difference between these diameters, the sleeve has its inner wall tapered at the bottom 8 to provide a complete adherence of the liquid to the wall as the liquid enters the tube 2.

Figure 5:
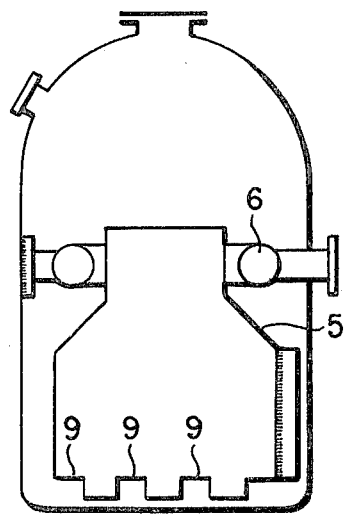
FIG. 5 is a diagrammatic illustration of the bell and collar shown in FIGS. 3 and 4.

FIG. 5 is a diagrammatic elevation of the bell 5 and the openings in the edge 9 thereof which rests against the tube plate 3, of the foraminous collar 6, and of the entire top header of the apparatus.

In the case in which an internal contact is desired between the vapors evolved in the tubes and the downflowing liquid, the bell is replaced by a cone which rests on legs affixed to the apparatus wall, or to the tube plate. In addition, the liquid-distributing collar is replaced by a foraminous plate through which the liquid oozes and strikes the cone surface and, thereafter, the apparatus walls and the tube plate. The contact between the falling liquid and the uprising vapors is achieved in a packed zone which is supported by said foraminous plate, through which the liquid oozes, the liquid being obviously distributed above the packed bed.

An embodiment such as described in the preceding paragraph is preferred in the case in which the feed of the apparatus is not composed of a liquid only but of a liquid plus vapors, such as occurs, for example, when the fluid to be treated undergoes an expansion followed by evolution of vapors.

Figure 1:
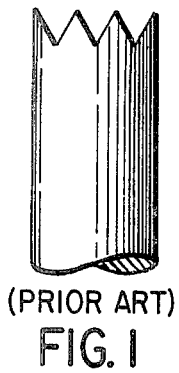
FIG. 1 is an elevation of a prior art type of sleeve.
Figure 2:
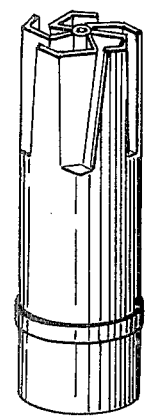
FIG. 2 is an elevation of another prior art type of sleeve.
Figure 6:
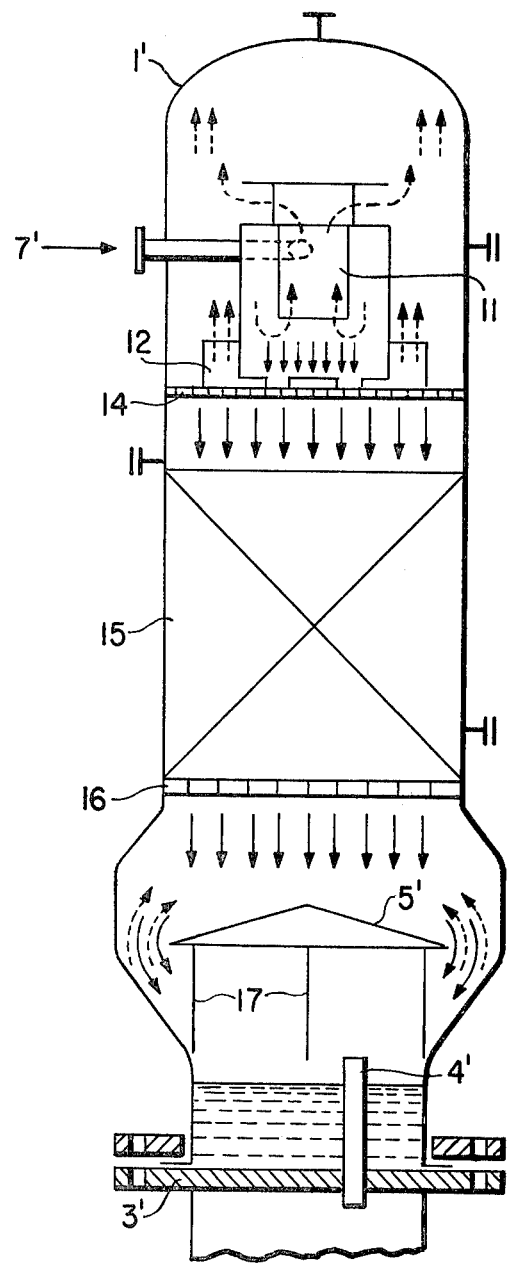
FIG. 6 is diagrammatic illustration of a modified form of liquid distributor for tube-bundle, thin-film apparatus, to which liquid and vapors are fed, embodying our invention.

Such a case is described with reference to the accompanying FIG. 6, the embodiments shown therein not to be construed in any case as a limitation of this invention.

The mixture of liquid and vapor is fed to the interior of shell 1' through the conduit 7'. The liquid is separated from the vapor by means known in the art, such as for example a cyclone, diagrammatically indicated in FIG. 6 by the reference numeral 11. The separated gases rise upwards (dotted arrows), whereas the liquid falls down and is distributed by a distributor 12 and caused to pass through the foraminous plate 14, and enters the bed 15, packed with Raschig-rings, for example wherein it contacts the vapors rising from the bottom. The liquid is then passed through another foraminous plate 16 which supports the packed bed and, therefrom, it impinges the surface of a metallic cone 5' which rests on the inner wall of shell 1' by means of legs 17.

The liquid glides over the conical surface and is collected on the tube plate 3', the feed being from the outside towards the inside. From the tube plate 3', the liquid is passed, through the bores in sleeves 4' into the tubes (such as the tubes 2 shown in FIG. 4) of the apparatus, in the form of a thin film.

What we claim is:

1. Tube-bundle, thin-film apparatus for the treatment of a liquid including a shell, a horizontal tube plate supported in said shell and a vertically arranged thin-film tube-bundle depending therefrom, wherein the improvement comprises a liquid distributor having:
   (a) a bell having a lower edge resting on the top of said horizontal tube plate, said bell having an open top and openings in the edge resting on said tube plate and an outer diameter less than the inner diameter of said shell to provide an annular zone above said tube plate between the bell and the shell;
   (b) a foraminous collar mounted in the shell adjacent the top of said bell and adapted to feed liquid to said annular zone;
   (c) a conduit extending through the wall of said shell and communicating with said foraminous collar to supply liquid thereto, said liquid flowing into the annular zone and onto the plate wherein said liquid flows through the openings in the edge and creates a liquid head in the bell;
   (d) distribution sleeves extending through and projecting above said tube plate and connected to the respective tubes comprising said tube bundle, each of said sleeves being formed from a cylindrical pipe and attached at its lower end to its associated tube and having an inside diameter smaller than the inside diameter of said associated tube, and having at least one set of bores extending through its wall tangentially to the inner surface of said sleeve wall above said tube plate and below the liquid head so that liquid may be fed through said distributor sleeves and along the inside thereof to their respective associated tubes and caused to flow over the inner surfaces of said tubes in thin films.

2. A distributor as claimed in claim 1, wherein the diameter of the sleeve bores is between 0.2 millimeters and 12 millimeters.

3. A distributor as claimed in claim 1, wherein each set of said sleeve bores lies on the same horizontal plane.

4. A distributor as claimed in claim 1, wherein said sleeve bores are evenly spaced apart from each other.

* * * * *